United States Patent
Park et al.

(10) Patent No.: US 11,337,215 B2
(45) Date of Patent: May 17, 2022

(54) APPARATUS AND METHOD FOR PREVENTING INTERFERENCE WITH WIRELESS COMMUNICATION

(71) Applicant: Samsung Electronics Co., Ltd., Gyeonggi-do (KR)

(72) Inventors: Byunghwa Park, Gyeonggi-do (KR); Seho Park, Gyeonggi-do (KR); Dongyoung Lee, Gyeonggi-do (KR); Kwangyeol Lee, Gyeonggi-do (KR); Yongyoun Kim, Gyeonggi-do (KR); Yongsang Yun, Gyeonggi-do (KR); Chihyun Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 55 days.

(21) Appl. No.: 16/870,243

(22) Filed: May 8, 2020

(65) Prior Publication Data
US 2020/0359381 A1  Nov. 12, 2020

(30) Foreign Application Priority Data
May 10, 2019  (KR) .......................... 10-2019-0054871

(51) Int. Cl.
| H04W 72/04 | (2009.01) |
| H04W 72/02 | (2009.01) |
| H04B 5/00  | (2006.01) |

(52) U.S. Cl.
CPC ...... H04W 72/0453 (2013.01); H04B 5/0037 (2013.01); H04W 72/02 (2013.01)

(58) Field of Classification Search
CPC . H04W 72/0453; H04W 72/02; H04W 36/06; H04W 84/12; H04B 5/0037;
(Continued)

(56) References Cited

U.S. PATENT DOCUMENTS

| 10,164,484 B2 * | 12/2018 | Zeine .................... H02J 50/80 |
| 2013/0244578 A1 * | 9/2013 | Bacioccola ....... H04M 1/72415 455/41.2 |

(Continued)

FOREIGN PATENT DOCUMENTS

| JP | 2013-172473 | 9/2013 |
| KR | 1020170107155 | 9/2017 |
| WO | WO 2019221466 | 11/2019 |

OTHER PUBLICATIONS

International Search Report dated Aug. 26, 2020 issued in counterpart application No. PCT/KR2020/006090, 8 pages.

*Primary Examiner* — Benjamin H Elliott, IV
(74) *Attorney, Agent, or Firm* — The Farrell Law Firm, P.C.

(57) ABSTRACT

An electronic device and method of operating an electronic device are provided. The method includes receiving a wireless charging request from an external electronic device while wireless communication with the external electronic device is performed through a communication circuit of the electronic device, identifying a second frequency, based on a first frequency being used by the wireless communication circuit for the wireless communication, in response to the wireless charging request, and transmitting wireless power to the external electronic device, based on the identified second frequency through a wireless charging circuit of the electronic device while wireless communication with the external electronic device is performed.

20 Claims, 12 Drawing Sheets

(58) Field of Classification Search
CPC .. H04B 7/0808; H04B 7/0842; H04B 5/0031; H04B 15/02; H02J 50/80; H02J 50/23; H02J 50/90
See application file for complete search history.

(56) References Cited

U.S. PATENT DOCUMENTS

| | | | |
|---|---|---|---|
| 2014/0194092 A1* | 7/2014 | Wanstedt | G06Q 50/10 455/406 |
| 2015/0022016 A1* | 1/2015 | Kim | H04B 5/0037 307/104 |
| 2015/0042167 A1* | 2/2015 | Kim | H02J 50/80 307/104 |
| 2015/0137750 A1* | 5/2015 | Kirby | G06F 8/65 320/108 |
| 2015/0326062 A1* | 11/2015 | Gonzalez Valdez | H02J 50/90 320/108 |
| 2016/0099604 A1* | 4/2016 | Von Novak, III | H02J 5/005 320/108 |
| 2017/0025887 A1* | 1/2017 | Hyun | H02J 7/00714 |
| 2017/0093197 A1* | 3/2017 | Gao | H04W 4/80 |
| 2017/0289905 A1* | 10/2017 | Chen | H04W 52/0209 |
| 2017/0294798 A1* | 10/2017 | Yuk | H04B 5/0037 |
| 2018/0048178 A1 | 2/2018 | Leabman | |
| 2018/0175677 A1* | 6/2018 | Lee | H04B 5/0037 |
| 2020/0006988 A1* | 1/2020 | Leabman | H02J 50/80 |
| 2020/0235611 A1* | 7/2020 | Zeine | H02J 7/02 |
| 2020/0359381 A1* | 11/2020 | Park | H04B 7/0808 |

\* cited by examiner

APPARATUS AND METHOD FOR PREVENTING INTERFERENCE WITH WIRELESS COMMUNICATION

CROSS-REFERENCE TO RELATED APPLICATION(S)

This application is based on and claims priority under 35 U.S.C. 119 to Korean Patent Application Serial No. 10-2019-0054871, filed on May 10, 2019, in the Korean Intellectual Property Office, the disclosure of which is herein incorporated by reference in its entirety.

BACKGROUND

1. Field

The present disclosure relates generally to an apparatus and a method for preventing interference with wireless communication.

2. Description of Related Art

Wireless power reception devices may wireless receive power from wireless power transmission devices through a wireless interface. The wireless power reception devices may perform wireless communication with other electronic devices (e.g., access points) through a wireless interface.

An electronic device may perform wireless communication with another electronic device (e.g., an access point) while wirelessly receiving power from a wireless power transmission device through a wireless interface. When a frequency band of power wirelessly supplied from the wireless power transmission device is the same as a frequency band of a wireless communication signal for wireless communication with another electronic device (e.g., an access point) or is a band adjacent thereto, sensitivity of the wireless communication signal received by a wireless power reception device may deteriorate. Accordingly, a scheme for preventing deterioration of the sensitivity of the wireless communication signal received while the wireless power reception device wireless receives power from the wireless power transmission device is needed.

SUMMARY

The present disclosure has been made to address at least the disadvantages described above and to provide at least the advantages described below.

In accordance with an aspect of the disclosure, an electronic device is provided. The electronic device includes a wireless communication circuit comprising a first antenna and configured to perform wireless communication with an external electronic device through the first antenna, a wireless charging circuit comprising a second antenna and configured to transmit wireless power to the external electronic device through the second antenna, a memory configured to store instructions, and a processor operatively connected to the wireless communication circuit, the wireless charging circuit, and the memory. The instructions, when executed, cause the processor to receive a wireless charging request from the external electronic device while wireless communication with the external electronic device is performed through the wireless communication circuit, identify a second frequency based on a first frequency being used by the wireless communication circuit for the wireless communication in response to the wireless charging request, and transmit wireless power to the external electronic device based on the identified second frequency through the wireless charging circuit while wireless communication with the external electronic device is performed.

In accordance with an aspect of the disclosure, a method of operating an electronic device is provided. The method includes receiving a wireless charging request from an external electronic device while wireless communication with the external electronic device is performed through a communication circuit of the electronic device, identifying a second frequency, based on a first frequency being used by the wireless communication circuit for the wireless communication, in response to the wireless charging request, and transmitting wireless power to the external electronic device, based on the identified second frequency through a wireless charging circuit of the electronic device while wireless communication with the external electronic device is performed.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
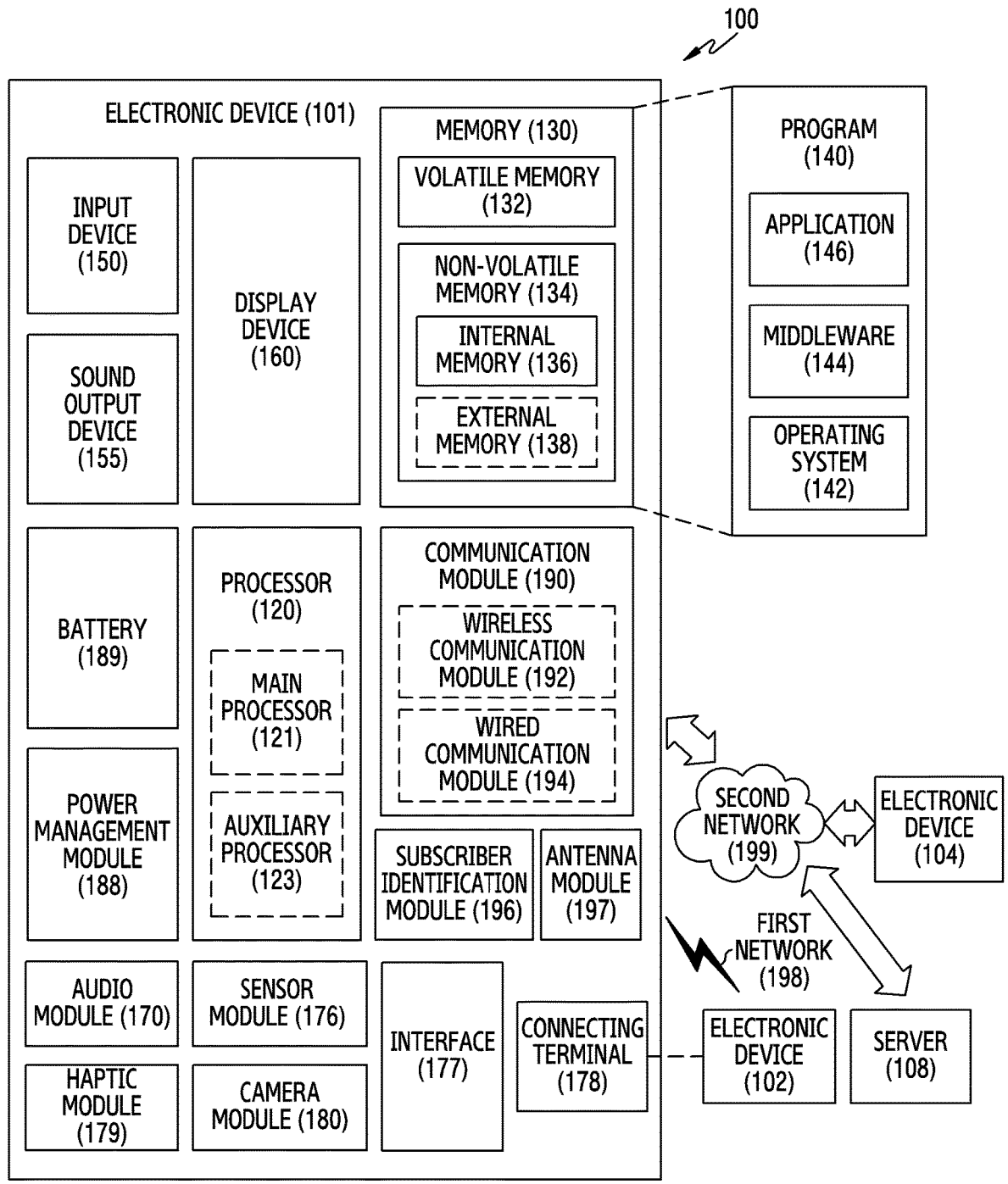
FIG. 1 is a block diagram of an electronic device within a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

FIG. 1 is a block diagram illustrating an electronic device 101 in a network environment 100, according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a CPU or an AP), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
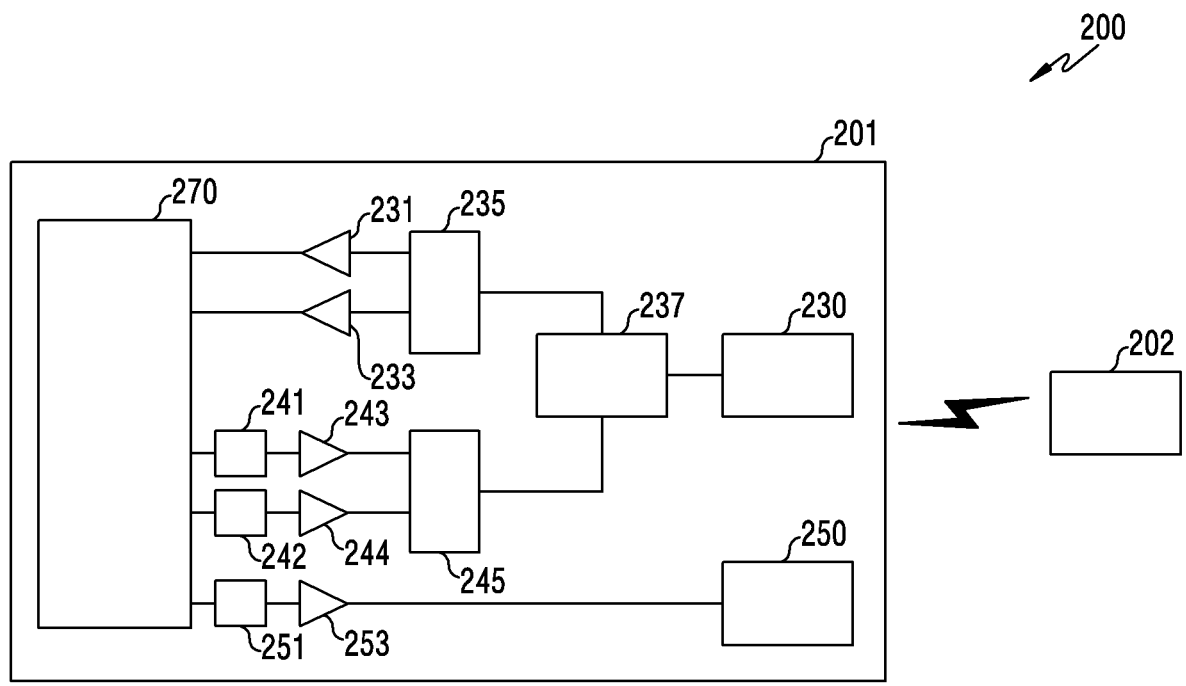
FIG. 2 is a diagram of an electronic device with a network environment, according to an embodiment.
Figure 3:
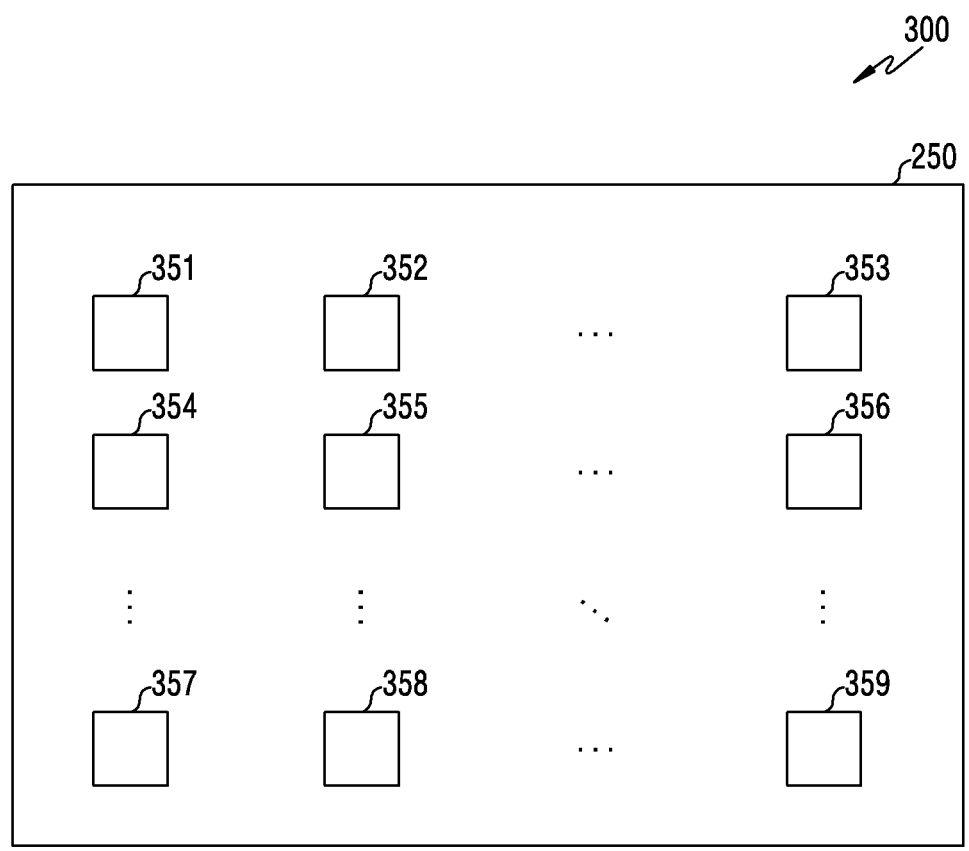
FIG. 3 is a diagram of an array antenna of an electronic device, according to an embodiment.
Figure 4:
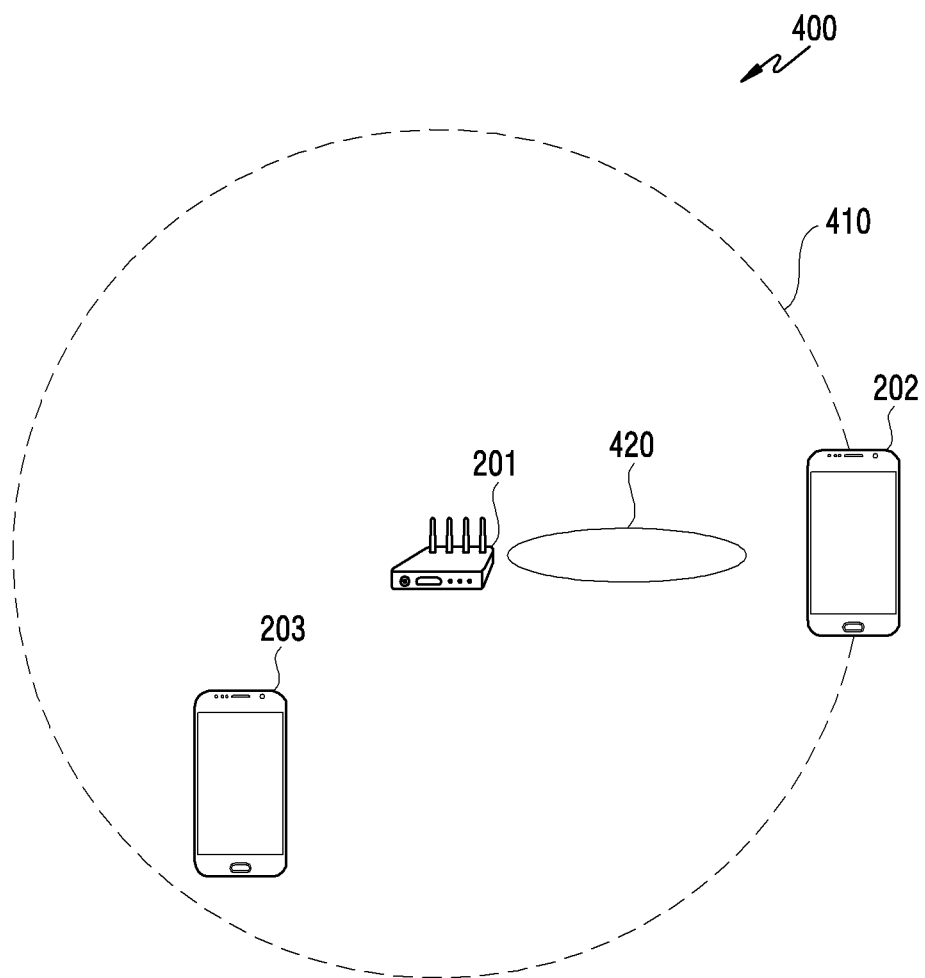
FIG. 4 is a diagram of wireless signals of an electronic device, according to an embodiment.
Figure 5:
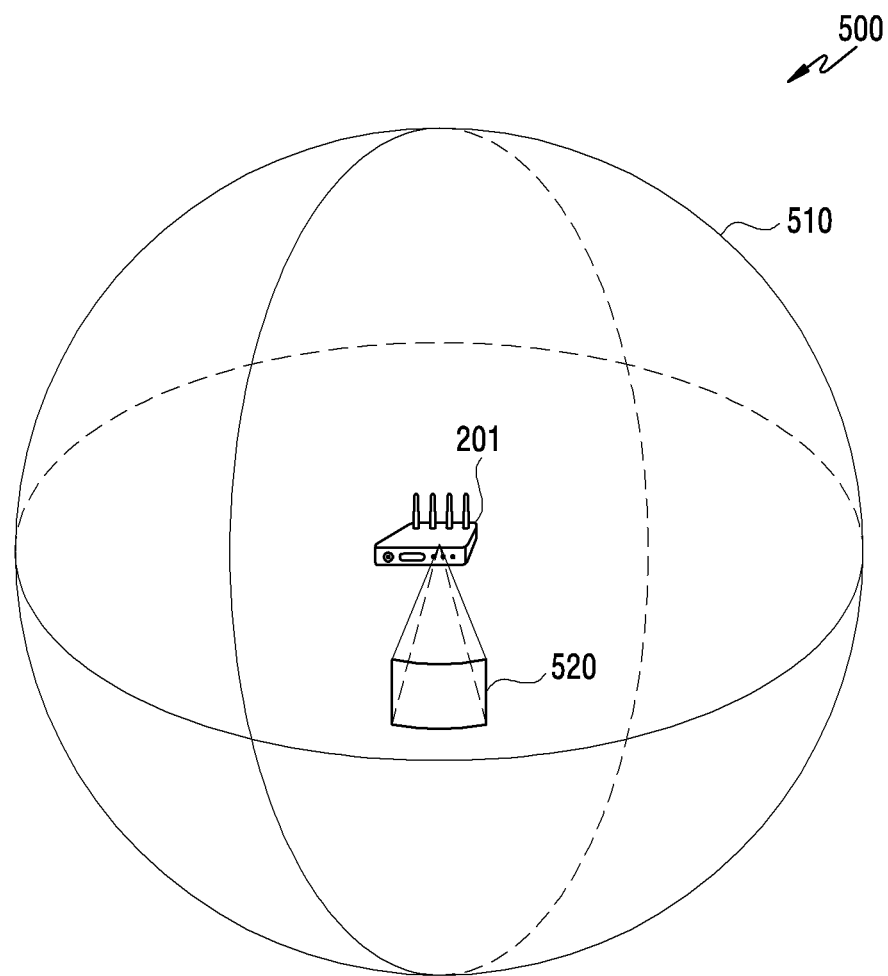
FIG. 5 is a diagram of a wireless charging area of an electronic device, according to an embodiment.

FIG. 2 is a diagram 200 of an electronic device 201 within a network environment, according to an embodiment. FIG. 3 is a diagram 300 of an array antenna 250 of an electronic device (e.g., the electronic device 201 of FIG. 2), according to an embodiment. FIG. 4 is a diagram 400 of radio signals 410 and 420 of the electronic device 201, according to an embodiment. FIG. 5 is a diagram 500 of a wireless charging area 520 of the electronic device 201, according to an embodiment. The electronic device 201 of FIG. 2 may correspond to the electronic device 101 of FIG. 1.

The electronic device 201 may include an antenna 230, a plurality of amplifiers 231, 233, 243, 244, and 253, a demultiplexer (demux) 235, a switch 237, a plurality of filters 241, 242, and 251, a multiplexer (mux) 245, an array antenna 250, a processor 270, or a combination thereof. The electronic device 201 may perform wireless communication with an external electronic device 202 through the antenna 230 on the basis of a preset wireless communication scheme (e.g., Wi-Fi). The electronic device 201 may transmit a wireless charging signal according to a configured wireless charging scheme (e.g., an electromagnetic wave scheme) to the external electronic device 202 through the array antenna 250.

The antenna 230 may receive a wireless communication signal from the external electronic device 202. The antenna 230 may convert the wireless communication signal received from the external electronic device 202 into a communication signal. The antenna 230 may transfer the received communication signal to the demux 235 through the switch 237. The demux 235 may transfer a communication signal received through one of the two amplifiers 231 and 233 to the processor 270 o the basis of a frequency of the received communication signal. The wireless communication signal may be a non-directional signal.

When the frequency of the received communication signal is included in a first frequency band (e.g., 2.4 GHz), the demux 235 may transfer a communication signal received through the amplifier 231 among the two amplifiers 231 and 233 to the processor 270. When the frequency of the received communication signal is included in a second frequency band (e.g., 5.8 GHz), the demux 235 may transfer a communication signal received through the amplifier 233 among the two amplifiers 231 and 233 to the processor 270. Each of the two amplifiers 231 and 233 may amplify the communication signal received from the demux 235 and transfer the amplified communication signal to the processor 270.

The antenna 230 may transmit a wireless communication signal to the external electronic device 202. The antenna 230 may convert a communication signal received from the mux 245 through the switch 237 into a wireless communication signal and transmit the converted wireless communication signal to the external electronic device 202. The wireless communication signal may be a non-directional signal.

The mux 246 may select one of the two amplifiers 243 and 244 and transfer a communication signal received through the selected amplifier to the antenna 230 through the switch 237. The amplifier 243 may amplify a communication signal of a first frequency (e.g., a first frequency band (e.g., 2.4 GHz)) received from the processor 270 through the filter 241 and transfer the communication signal to the mux 245. The amplifier 244 may amplify a communication signal of a second frequency (e.g., a second frequency band (e.g., 5.8 GHz)) received from the processor 270 through the filter 242 and transfer the communication signal to the mux 245. The filter 241 may allow the signal of the first frequency band (e.g., 2.4 GHz) to pass therethrough and may filter signals of the other frequency bands. The filter 242 may allow the signal of the second frequency band (e.g., 5.8 GHz) to pass therethrough and may filter signals of the other frequency bands.

The array antenna 250 may include a plurality of antennas 351 to 359 arranged in a preset structure. The plurality of antennas 351 to 359 may be at least one of a patch antenna, a loop antenna, or a dipole antenna. The preset structure may be a linear arrangement structure, a planar arrangement structure (e.g., a circular arrangement structure or a rectangular arrangement structure), a nonplanar arrangement structure (e.g., a curved arrangement structure or a three-dimensional arrangement structure), or a combination thereof.

The array antenna 250 may generate a wireless charging signal on the basis of a charging signal received from the processor 270 through the filter 251 and the amplifier 253. The array antenna 250 may control a phase of the charging signal transmitted to each of the plurality of antennas 351 to 359 so as to generate a wireless charging signal having a preset radiation pattern. The array antenna 250 may transmit a wireless charging signal having a preset radiation pattern to the external electronic device 202. The array antenna 250 may generate a wireless charging signal having a preset radiation pattern to make an electric intensity of the wireless charging signal maximum at a preset location. The preset radiation pattern may be changed on the basis of at least one of the location of the external electronic device 202 or a preset wireless charging area.

The processor 270 may generate a communication signal on the basis of a wireless communication scheme (e.g., Wi-Fi) and output the generated communication signal to the outside through the antenna 230. The wireless communication signal output through the antenna 230 may have a non-directional radiation pattern 410. The external electronic devices 202 and 203 located within a communication range may receive the wireless communication signal output through the antenna 230.

The processor 270 may establish a connection between the electronic device 201 and the external electronic devices 202 and 203 on the basis of at least one of an in-band scheme or an out-of-band scheme. The processor 270 may establish the connection between the electronic device 201 and the external electronic devices 202 and 203 through the antenna 230, the array antenna 250, or a combination thereof. The processor 270 may generate a beacon frame including a service set identifier (SSID) of the electronic device 201 and broadcast the generated beacon frame through a communication module (e.g., the communication module 190 of FIG. 1). The external electronic devices 202 and 203 may receive beacon frames and identify the electronic device 202 as an access point. The electronic device 201 may generate each of a beacon frame for establishing the connection based on a first frequency band (e.g., 2.4 GHz) among preset frequency bands and a beacon frame for establishing the connection based on a second frequency band (e.g., 5.8 GHz) among preset frequency bands. The external electronic devices 202 and 203 may identify the electronic device 201 as an access point on the basis of at least one beacon frame among beacon frames for frequency bands.

The processor 270 may authenticate each of the external electronic devices 202 and 203 in response to an authentication request from each of the external electronic devices 202 and 203. The processor 270 may combine with each of the external electronic devices 202 and 203 in response to a combination request from each of the external electronic devices 202 and 203. The processor 270 may establish the connection with each of the external electronic devices 202 and 203 based on the same frequency band (e.g., 5.8 GHz). The connection with each of the external electronic devices 202 and 203 based on the same frequency band (e.g., 5.8 GHz) may be the connection based on different channels. The processor 270 may establish connections with the external electronic devices 202 and 203 based on different frequency bands (e.g., 2.4 GHz and 5.8 GHz).

The processor 270 may transmit and receive a wireless communication signal to and from each of the external electronic devices 202 and 203 through the antenna 230. The wireless communication signal may be transmitted and received between the electronic device 201 and each of the external electronic devices 202 and 203 through the established connection.

The processor 270 may acquire information on a frequency band in which a wireless signal can be received from each of the external electronic devices 202 and 203 while the connection between the electronic device 201 and each of the external electronic devices 202 and 203 is established. The processor 270 may store information on the frequency band of the acquired wireless signal that can be received in a memory 130.

The processor 270 may generate a charging signal on the basis of a wireless charging scheme (e.g., an electromagnetic wave transmission scheme) and output the generated charging signal to the outside through the array antenna 250. The wireless charging signal output through the antenna 250 may have a directional radiation pattern 420. An intensity of the wireless charging signal output through the antenna 250 may be 40 dBm (that is, 10 W). The external electronic device 202 located in a direction according to the directional radiation pattern 420 among the external electronic devices 202 and 203 may receive the wireless charging signal output through the antenna 250. An intensity of the wireless charging signal received by the external electronic device 202 may decrease as a distance between the electronic device 201 and the external electronic device 202 increases. The external electronic device 203 located in a direction other than the direction according to the directional radiation pattern 420 among the external electronic devices 202 and 203 may not receive the wireless charging signal output through the antenna 250. Although the external electronic device 203 located in the direction other than the direction according to the directional radiation pattern 420 among the external electronic devices 202 and 203 receives the wireless charging signal output through the antenna 250, the intensity of the received wireless charging signal may not be large enough to charge a battery of the external electronic device 203. It has been described that the intensity of the wireless charging signal output through the antenna 250 is 40 dBm (that is, 10 W), but is only an example. The intensity of the wireless charging signal may be changed according to the arrangement structure of each of the plurality of antennas 351 to 359 of the antenna 250, and may be changed according to the distance between the electronic device 201 and the external electronic device 202.

The processor 270 may control a phase of the charging signal transmitted to each of the plurality of antennas 351 to 359 of the array antenna 250 to output the charging signal generated on the basis of the wireless charging scheme to a wireless charging area 520 in an area 510 in which wireless charging is possible. The processor 270 may generate phase information on the basis of location information of the wireless charging area 520 and provide the generated phase information to the array antenna 250, and thus the array antenna 250 may control the phase of the charging signal transferred to each of the plurality of antennas 351 to 359 on the basis of the phase information. The processor 270 may control (e.g., increase) the number of antennas into which the charging signal is input among the plurality of antennas 351 to 359 or increase the intensity of the charging signal input into each of the plurality of antennas 351 to 359 to output the charging signal generated on the basis of the wireless charging scheme to the wireless charging area 520.

The processor 270 may configure the wireless charging area 520 on the basis of location information of the electronic device (e.g., the external electronic device 202) making a request for wireless charging among the external electronic devices 202 and 203. The processor 270 may allow the array antenna 250 to control the phase of the charging signal transferred to each of the plurality of antennas 351 to 359 on the basis of reference phase information corresponding to location information of the external electronic device 202. The external electronic device 202 may receive a wireless charging signal converted from the charging signal through the array antenna 250. The external electronic device 202 may transmit intensity information of the received wireless charging signal to the electronic device 201.

The processor 270 may compare the reference intensity of the wireless charging signal according to the distance between the electronic device 201 and the external electronic device 202 with the intensity according to intensity information from the external electronic device 20 and determine whether to modify the phase information. When the intensity according to the intensity information is lower than the reference intensity, the processor 270 may determine that the phase information needs to be modified. When the intensity according to the intensity information is greater than or equal to the reference intensity, the processor 270 may determine that the phase information does not need to be modified. The processor 270 may compare the reference intensity of the wireless charging signal according to the distance between the electronic device 201 and the external electronic device 202 with the intensity according to intensity information from the external electronic device 202, and control (e.g., increase) the number of antennas into which the charging signal is input among the plurality of antennas 351 to 359 or increase the intensity of the charging signal input into each of the plurality of antennas 351 to 359.

The processor 270 may configure a plurality of scan areas on the basis of the location of the external electronic device 202 and allow the array antenna 250 to control the phase of the charging signal transferred to each of the plurality of antennas 351 to 359 on the basis of reference phase information according to each of the plurality of scan areas. The external electronic device 202 may receive a wireless charging signal converted from the charging signal on the basis of the reference phase information according to each of the plurality of scan areas through the array antenna 250. The external electronic device 202 may transmit intensity information of the received wireless charging signal to the electronic device 201. The processor 270 may identify a scan area indicating intensity information of the highest intensity among the plurality of scan areas on the basis of a plurality of pieces of intensity information received from the external electronic device 202. The processor 270 may configure the identified scan area as the wireless charging area 520.

The processor 270 may determine a frequency of the wireless charging signal on the basis of a frequency band of a frequency used for wireless communication between the electronic device 201 and the external electronic device 202 in response to a wireless charging request from the external electronic device 202. The processor 270 may identify whether the frequency band of the frequency used for wireless communication between the electronic device 201 and the external electronic device 202 is the same as a frequency band of a wireless charging signal on the basis of a wireless charging request from the external electronic device 202. The processor 270 may receive the wireless charging request from the external electronic device 202 through the antenna 230, the array antenna 250, or a combination thereof.

The processor 270 may determine the frequency of the wireless charging signal on the basis of information on a frequency band of a wireless signal which can be received by the external electronic device 202. The processor 270 may determine the frequency of the wireless charging signal to distinguish between the frequency band of the frequency of the wireless charging signal and the frequency band of the frequency of the wireless communication signal on the basis of information on the frequency band of the wireless signal which can be received by the external electronic device 202.

When the frequency band of the frequency used for wireless communication with the external electronic device 202 is the same as the frequency band of the wireless charging signal, the processor 270 may identify whether the frequency band of the frequency used for wireless communication with the external electronic device 202 can be changed on the basis of information on the frequency band of the wireless signal which can be received by the external electronic device 202. When the frequency band of the frequency of the wireless communication signal which is being used for wireless communication with the external electronic device 202 can be changed, the frequency band of the frequency of the wireless communication signal may be changed such that the frequency band of the frequency of the wireless charging signal is distinguished from the frequency band of the frequency of the wireless communication signal.

According to an embodiment, when it is identified that the frequency band of the frequency used for wireless communication with the external electronic device 202 can be changed, the processor 270 may change the frequency band of the frequency used for wireless communication with the external electronic device 202 to a first frequency band (e.g., 2.4 GHz). The processor 270 may transmit the wireless charging signal to the external electronic device 202 on the basis of a second frequency band (e.g., 5.8 GHz) while transmitting and receiving the wireless communication signal to and from the external electronic device 202 on the basis of the first frequency band (e.g., 2.4 GHz).

When it is identified that the frequency band of the frequency used for wireless communication with the external electronic device 202 cannot be changed, the processor 270 may identify an idle time of wireless communication. The processor 270 transmit the wireless charging signal to the external electronic device 202 on the basis of the second frequency band (e.g., 5.8 GHz) at the identified idle time. The idle time may be a time during which no wireless communication signal is transmitted or received through the connection. When it is identified that the frequency band of the frequency of the wireless communication signal cannot be changed, the processor 270 may transmit the wireless charging signal to the external electronic device 202 using a frequency included in a frequency band that is the same as the frequency band of the frequency used for wireless communication with the external electronic device 202. When the frequency band of the frequency of the wireless communication signal cannot be changed, the frequency of the wireless charging signal and the frequency of the wireless communication signal may be frequencies for different channels in the same frequency band.

When it is identified that the frequency band of the frequency used for wireless communication with the external electronic device 202 cannot be changed, the processor 270 may identify whether the frequency band of the frequency of the wireless charging signal can be changed. The processor 270 may transmit the wireless charging signal to the external electronic device 202 on the basis of the first frequency band (e.g., 2.4 GHz) while transmitting and receiving the wireless communication signal to and from the external electronic device 202 on the basis of the second frequency band (e.g., 5.8 GHz) through the connection. When it is identified that the frequency band of the frequency used for wireless communication with the external electronic device 202 cannot be changed, the processor 270 may change the frequency used for wireless communication with the external electronic device 202 to a frequency according to a first channel among a plurality of channels included in the frequency band (e.g., 5.8 GHz). The processor 270 may transmit and receive the wireless communication signal to and from the external electronic device 202 on the basis of the frequency according to the first channel. The processor 270 may transmit the wireless charging signal to the external electronic device 202 on the basis of a frequency according to a second channel among a plurality of channels included in the frequency band (e.g., 5.8 GHz). The first channel and the second channel may be two channels having the largest difference in the center frequency among a plurality of channels included in the frequency band (e.g., 5.8 GHz). The first channel may be a channel having the lowest center frequency among a plurality of channels. The second channel may be a channel having the highest center frequency among a plurality of channels.

The processor 270 may identify whether the external electronic device 202 is located in an area in which wireless charging is possible on the basis of a wireless charging request from the external electronic device 202. The processor 270 may identify whether the external electronic device 202 is located in the area in which wireless charging is possible on the basis of location information of the external electronic device 202. The processor 270 may identify whether the external electronic device 202 is located in the area in which wireless charging is possible by scanning the area in which wireless charging is possible.

When it is identified that the external electronic device 202 is not located in the area in which wireless charging is possible, the processor 270 may transmit a signal making a request for placing the external electronic device 202 in the area in which wireless charging is possible. The external electronic device 202 may display a user interface making a request for placing the external electronic device 202 in the area in which wireless charging is possible on a display device of the external electronic device 202 in response to the request.

The processor 270 may identify whether a preset wireless charging area exists on the basis of the wireless charging request from the external electronic device 202. The processor 270 may identify whether the external electronic device 202 is located in the preset wireless charging area. The processor 270 may identify whether the external electronic device 202 is located in the preset wireless charging area on the basis of location information of the external electronic device 202. The processor 270 may output the wireless charging signal to the preset wireless charging area on the basis of reference phase information corresponding to the preset wireless charging area and identify whether the external electronic device 202 is located in the preset wireless charging area on the basis of the intensity according to intensity information of the wireless charging signal from the external electronic device 202.

When it is identified that the external electronic device 202 is not located in the preset wireless charging area, the processor 270 may transmit a signal making a request for placing the external electronic device 202 in the preset wireless charging area. The external electronic device 202 may display a user interface making a request for placing the external electronic device 202 in the preset wireless charging area on the display device of the external electronic device 202 on the basis of the request.

When it is identified that the external electronic device 202 is located in the preset wireless charging area, the processor 270 may allow the array antenna 250 to control a phase of a charging signal transferred to each of the plurality of antennas 351 to 359 on the basis of reference phase information corresponding to the preset wireless charging area.

The processor 270 may configure the wireless charging area on the basis of a wireless charging area configuration request from the external electronic device 202. The processor 270 may receive location information from the external electronic device 202 and configure an area having a preset size from the location according to the received location information as the wireless charging area. The location information received from the external electronic device 202 may include the location of the external electronic device 202, the location of an object included in a preview image acquired by a camera of the external electronic device 202, or a combination thereof. The camera of the external electronic device 202 may be implemented as a depth camera. The external electronic device 202 may identify the location in an actual space of objects included in a preview image acquired through a depth camera.

Figure 6:
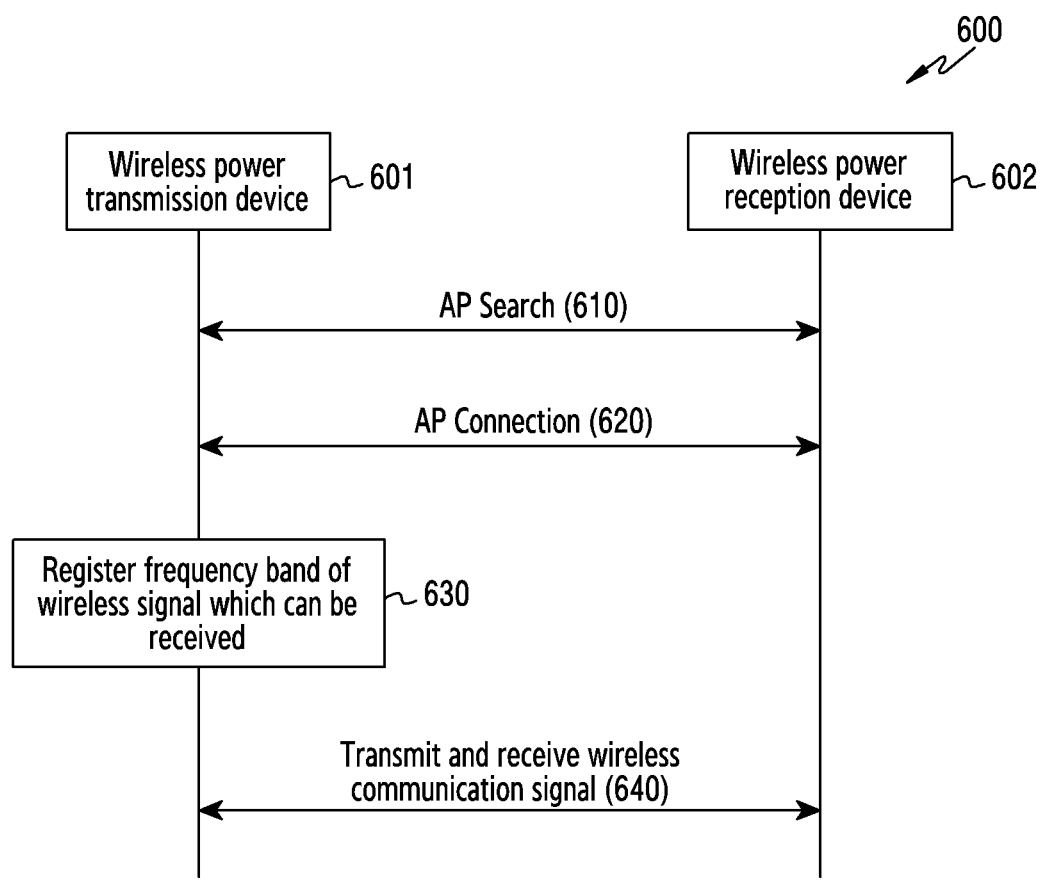
FIG. 6 is a flow diagram of a wireless communication signal transmission/reception procedure of a wireless power transmission device, according to an embodiment.

FIG. 6 is a flow diagram of a wireless communication signal transmission/reception procedure 600 of a wireless power transmission device 601, according to an embodiment. The wireless power transmission device 601 of FIG. 6 may correspond to the electronic device 101 of FIG. 1 or the electronic device 201 of FIG. 2. The wireless power reception device 602 of FIG. 6 may correspond to the electronic device 102 of FIG. 1 or the electronic device 202 of FIG. 2.

The devices 601 and 602 may search for an access point at step 610. The access point search may be at least one of a passive access point search or an active access point search. The passive access point search may include a process in which the wireless power transmission device 601 broadcasts a beacon frame including an SSID of the wireless power transmission device 601 and a process in which the wireless power reception device 602 receives the beacon frame including the SSID of the wireless power transmission device 601. The active access point search may include a process in which the wireless power reception device 602 broadcasts a probe request message, a process in which the wireless power transmission device 601 broadcasts a probe response message in response to the probe request message from the wireless power reception device 602, and a process in which the wireless power reception device 602 receives the probe response message from the wireless power transmission device 601.

The wireless power reception device 602 may identify two or more wireless networks (e.g., a wireless network using a frequency band of 2.4 GHz and a wireless network using a frequency band of 5.8 GHz) provided by the wireless power transmission device 601 at step 610.

The devices 601 and 602 may make an access point connection at step 620. The access point connection may include an authentication procedure and a combination procedure. In an open type, the authentication procedure may include a process in which the wireless power reception device 602 broadcasts an authentication request message, a process in which the wireless power transmission device 601 broadcasts an authentication response message in response to the authentication request message from the wireless power reception device 602, and a process in which the wireless power reception device 602 receives the authentication response message from the wireless power transmission device 601. In a shared key encryption type, the authentication procedure may include a process in which the wireless power reception device 602 broadcasts an authentication request message, a process in which the wireless power transmission device 601 broadcasts an authentication response message including challenge text in response to the authentication request message from the wireless power reception device 602, a process in which the wireless power reception device 602 receives the authentication response message from the wireless power transmission device 601 and encrypts and broadcasts the challenge text, and a process in which the encrypted challenge text is authenticated and an authentication result is broadcasted. The combination procedure may include a process in which the wireless power reception device 602 receives the authentication result and then broadcasts a combination request message and a process in which the wireless power transmission device 601 broadcasts a combination response message in response to the combination request message from the wireless power reception device 602.

The wireless power reception device 602 may be connected to at least one of two or more wireless networks provided by the wireless power transmission device 601 at step 620.

The wireless power transmission device 601 may register a frequency band of a wireless signal which can be received by the wireless power reception device 602 at step 630. The wireless power reception device 602 may insert information on the frequency band of the wireless signal which can be received into a message (e.g., an authentication request message) which the wireless power reception device 602 transmits to the wireless power transmission device 601 at steps 610 and 620 and transmit the message to the wireless power transmission device 601. The wireless power transmission device 601 may receive the information on the frequency band of the wireless signal which can be received and store the received information on the frequency band of the wireless signal which can be received in a memory (e.g., the memory 130 of FIG. 1). The frequency band of the wireless signal which can be received by the wireless power reception device 602 may include a frequency band of a wireless signal which can be received by the wireless power reception device 602 on the basis of a preset wireless communication scheme, a frequency band of a wireless signal which can be received by the wireless power reception device 602 on the basis of a preset wireless charging scheme, or a combination thereof. The frequency band of the wireless signal which can be received by the wireless power reception device 602 may include a band of 2.4 GHz, a band of 5.8 GHz, or a combination thereof.

The devices 601 and 602 may transmit and receive a wireless communication signal at step 640. The wireless reception device 602 may transmit and receive a wireless communication signal to and from the wireless power transmission device 601 through at least one wireless network connected at step 620.

Figure 7:
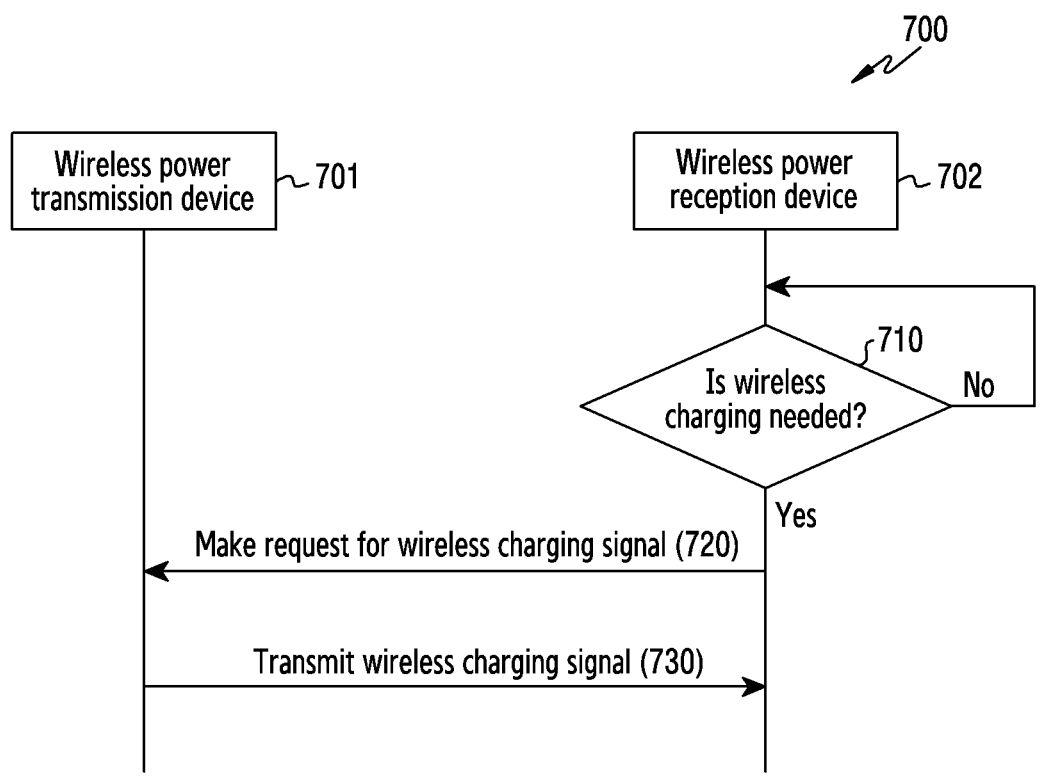
FIG. 7 is a flow diagram of a wireless charging signal transmission procedure of a wireless power transmission device, according to an embodiment.

FIG. 7 is a flow diagram of a wireless charging signal transmission procedure 700 of a wireless power transmission device 701, according to an embodiment. The wireless power transmission device 701 of FIG. 7 may correspond to the electronic device 101 of FIG. 1, the electronic device 201 of FIG. 2, or the wireless power transmission device 601 of FIG. 6. The wireless power reception device 702 of FIG. 7 may correspond to the electronic device 102 of FIG. 1, the electronic device 202 of FIG. 2, or the wireless power transmission device 602 of FIG. 6.

The wireless power reception device 702 may determine whether wireless charging is needed at step 710. When power of the battery of the wireless power reception device 702 is less than or equal to preset power, the wireless power reception device 702 may determine that wireless charging is needed. The wireless power reception device 702 may determine whether wireless charging is needed on the basis of a user input. When the wireless power reception device 702 is located within an area in which a signal for wireless charging of the wireless power transmission device 701 can be received, the wireless power reception device 702 may display a user interface for receiving the user input on a display device. When the user input in the user interface indicates wireless charging execution, the wireless power reception device 702 may determine that wireless charging is needed. When an automatic charging mode is configured, the wireless power reception device 702 may determine that wireless charging is needed. When the automatic charging mode is configured and the wireless power reception device 702 is located within an area in which a signal for wireless charging of the wireless power transmission device 701 can be received, the wireless power reception device 702 may determine that wireless charging is needed.

When it is determined that wireless charging is needed ("Yes"), the wireless power reception device 702 may perform step 720. When it is determined that wireless charging is not needed ("No"), the wireless power reception device 702 may perform step 710 again.

At step 720, the wireless power reception device 702 may transmit a message making a request for a wireless charging signal to the wireless power transmission device 701. The message making the request for the wireless charging signal may include information indicating the current location of the wireless power reception device 702.

When the message making the request for the wireless charging signal is received, the wireless power transmission device 701 may transmit the wireless charging signal to the wireless power reception device 702 at step 730. The wireless power transmission device 701 may transmit the wireless charging signal to the wireless power reception device 702 on the basis of the information indicating the current location included in the message making the request for the wireless charging signal.

Figure 8A:
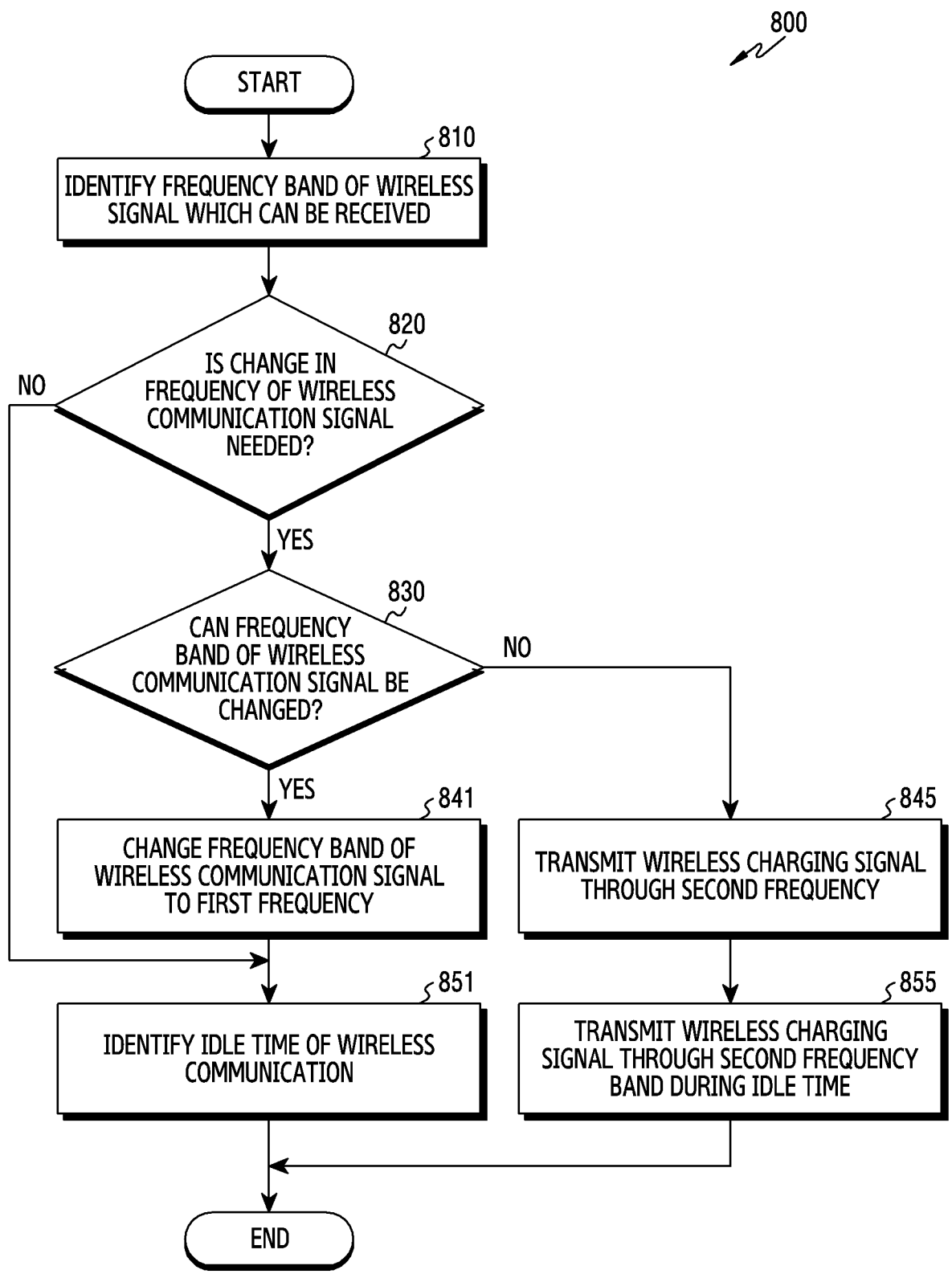
FIG. 8A is a flowchart of a wireless charging signal transmission procedure of an electronic device, according to an embodiment.

FIG. 8A is a flowchart of a wireless charging signal transmission procedure 800 of a wireless power transmission device, according to an embodiment. The wireless charging signal transmission procedure 800 may be included at step 730 of FIG. 7. The wireless charging signal transmission procedure 800 of FIG. 8A is described with reference to the configuration of the electronic device 101 of FIG. 1 or the electronic device 201 of FIG. 2.

At step 810, an electronic device 101 may identify a frequency band in which an external electronic device 102 can receive a wireless signal. The electronic device 101 may identify a frequency band in which the external electronic device 102 can receive a wireless signal on the basis of the frequency band in which the wireless signal can be received, registered at step 630. At step 810, wireless communication can be performed in a second frequency band.

At step 820, the electronic device 101 may identify whether a change in a frequency of a wireless communication signal is needed. The electronic device 101 may identify whether the change in the frequency of the wireless communication signal is needed on the basis of a frequency band of wireless communication according to the connection between the electronic device 101 and the external electronic device 102 and a frequency band of a wireless charging frequency of the electronic device 101.

When the frequency band of the wireless communication according to the connection between the electronic device 101 and the external electronic device 102 is the same as the frequency band of the wireless charging frequency of the electronic device 101, the electronic device 101 may identify that the change in the frequency of the wireless communication signal is needed. When the frequency band of the wireless communication according to the connection between the electronic device 101 and the external electronic device 102 is different from the frequency band of the wireless charging frequency of the electronic device 101, the electronic device 101 may identify that the change in the frequency of the wireless communication signal is not needed.

When it is identified that the change in the frequency of the wireless communication signal is needed ("Yes"), the electronic device 101 may perform step 830. When it is identified that the change in the frequency of the wireless communication signal is not needed ("No"), the electronic device 101 may perform step 851.

At step 830, the electronic device 101 may identify whether the frequency of the wireless communication signal can be changed. The electronic device 101 may identify whether the frequency of the wireless communication signal can be changed on the basis of the frequency in which the external electronic device 102 can receive the wireless signal.

When a frequency band different from the frequency band of the wireless charging frequency of the electronic device 101 is registered as the frequency in which the external electronic device 102 can receive the wireless signal, the electronic device 101 may identify that the frequency of the wireless communication signal can be changed. When a frequency band different from the frequency band of the wireless charging frequency of the electronic device 101 is not registered as the frequency in which the external electronic device 102 can receive the wireless signal, the electronic device 101 may identify that the frequency of the wireless communication signal cannot be changed When it is identified that the frequency of the wireless communication signal can be changed ("Yes"), the electronic device 101 may perform step 841. When it is identified that the frequency of the wireless communication signal cannot be changed ("No"), the electronic device 101 may perform step 841.

At step 841, the electronic device 101 may change the frequency of the wireless communication signal to a first frequency. The electronic device 101 may establish the connection with the external electronic device 102 according to the first frequency and release the connection with the external electronic device 102 according to the conventional frequency, so as to change the frequency of the wireless communication signal between the electronic devices 101 and 102 to the first frequency. The step in which the electronic device 101 changes the frequency of the wireless communication signal to the first frequency may be an operation based on a handover of changing the connection based on the conventional frequency to the connection based on the first frequency. The first frequency may be a frequency included in a frequency band (e.g., 2.4 GHz) different from the frequency band (e.g., 5.8 GHz) of the wireless charging frequency.

The electronic device 101 may display a user interface for changing the frequency of the wireless communication signal to the first frequency on a display device 160. The electronic device 101 may change the frequency of the wireless communication signal to the first frequency in response to a user input indicating a change to the first frequency on the user interface.

At step 845, the electronic device 101 may transmit a wireless charging signal of a second frequency. The electronic device 101 may transmit the wireless charging signal of the second frequency to the location of the external electronic device 102 to make the intensity of the wireless charging signal maximum. The second frequency may be a frequency included in a frequency band (e.g., 5.8 GHz) different from the frequency band (e.g., 2.4 GHz) of the first frequency.

At step 851, the electronic device may identify an idle time of wireless communication. The idle time of the wireless communication may be a time during which no data is transmitted or received through the connection according to the conventional frequency.

At step 855, the electronic device 101 may transmit the wireless charging signal of the second frequency in the idle time. The electronic device 101 may transmit the wireless charging signal of the second frequency to the location of the external electronic device 102 to make the intensity of the wireless charging signal maximum. The second frequency may be a frequency included in a frequency band (e.g., 5.8 GHz) which is the same as the frequency band (e.g., 5.8 GHz) of the conventional frequency.

When the wireless charging signal is transmitted in the idle time, the electronic device 101 may transmit and receive the wireless charging signal through a first channel among a plurality of channels included in the frequency band (e.g., 5.8 GHz), and transmit the wireless charging signal to the electronic device 202 on the basis of a frequency according to a second channel among the plurality of channels included in the frequency band (e.g., 5.8 GHz). The first channel and the second channel may be two channels having the largest difference in the center frequency among a plurality of channels included in the frequency band (e.g., 5.8 GHz). The first channel may be a channel having the lowest center frequency among a plurality of channels. The second channel may be a channel having the highest center frequency among a plurality of channels.

Figure 8B:
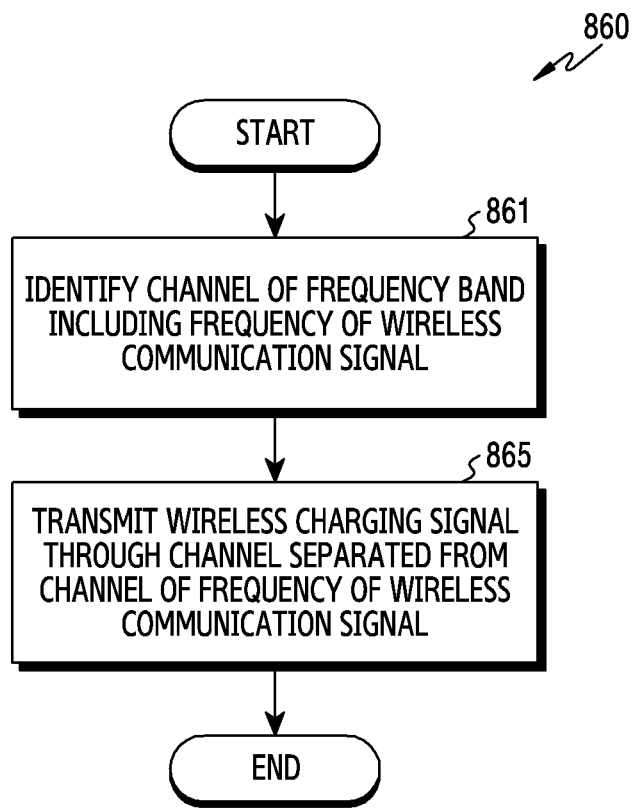
FIG. 8B is a flowchart of a wireless charging signal transmission procedure of a wireless power transmission device, according to an embodiment.

FIG. 8B is a flowchart of a wireless charging signal transmission procedure 860 of a wireless power transmission device 101, according to an embodiment. The wireless charging signal transmission procedure 860 of FIG. 8B may be included at steps 851 and 855 of FIG. 8. The wireless charging signal transmission procedure 860 of FIG. 8B is described with reference to the configuration of the electronic device 101 of FIG. 1 or the electronic device 201 of FIG. 2. Steps 861 and 865 of FIG. 8B may be performed simultaneously with steps 851 and 855 of FIG. 8A.

When it is identified that the frequency of the wireless communication signal cannot be changed at step 830 of FIG. 8A ("No"), the electronic device 101 may perform step 861 of FIG. 8B.

The electronic device 101 may identify a channel of a frequency band including the frequency of the wireless communication signal which is being used for wireless communication with the external electronic device 102 at step 861.

The electronic device 101 may transmit a wireless charging signal through a channel separated from the channel of the frequency of the wireless communication signal which is being used for wireless communication with the external electronic device 102 among identified channels at step 865. The electronic device 101 may transmit the wireless charging signal through a channel farthest from the channel of the frequency of the wireless communication signal among the identified channels.

Figure 9:
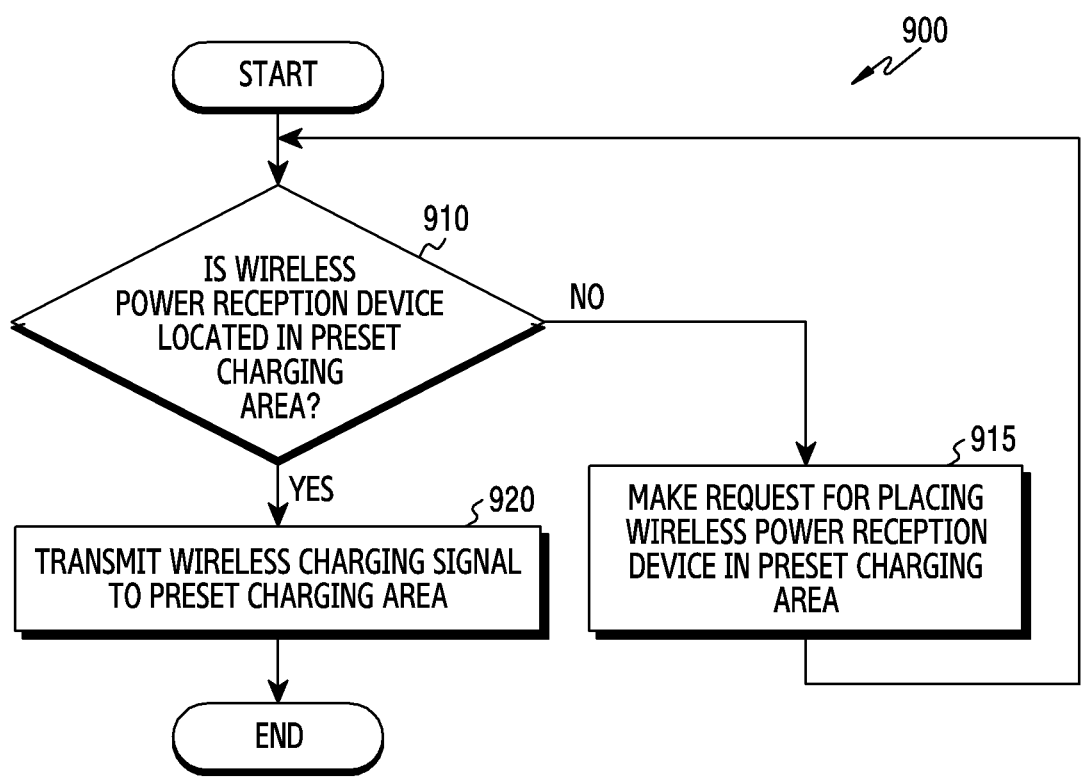
FIG. 9 is a flowchart of a wireless charging signal transmission procedure of an electronic device, according to an embodiment.

FIG. 9 is a flowchart of a wireless charging signal transmission procedure 900 of an electronic device 101, according to an embodiment. The wireless charging signal transmission procedure 900 of FIG. 9 may be included at step 730 of FIG. 7. The wireless charging signal transmission procedure 900 of FIG. 9 may be included in each of steps 851 and 855 of FIG. 8. The wireless charging signal transmission procedure 900 of FIG. 9 is described with reference to the configuration of the electronic device 101 of FIG. 1 or the electronic device 201 of FIG. 2.

At step 910, the electronic device 101 may identify whether the external electronic device 102 is located in a preset wireless charging area. The electronic device 101 may output a wireless charging signal to the preset wireless charging area on the basis of reference phase information corresponding to the preset wireless charging area and identify whether the external electronic device 102 is located in the preset wireless charging area on the basis of the intensity according to intensity information of the wireless charging signal from the external electronic device 102.

When it is identified that the external electronic device 102 is located in the preset wireless charging area ("Yes"), the electronic device 101 may perform step 920. When it is identified that the external electronic device 102 is not located in the wireless charging area ("No"), the electronic device 101 may perform step 915.

When it is identified that the external electronic device 102 is not located in the preset wireless charging area, the electronic device 101 may transmit a signal making a request for placing the external electronic device 102 in the preset wireless charging area to the external electronic device 102 at step 915. The external electronic device 102 may display a user interface making a request for placing the external electronic device 202 in the preset wireless charging area on the display device of the external electronic device 102 on the basis of the request.

At step 920, the electronic device 101 may transmit the wireless charging signal to the preset charging area. The electronic device 101 may transmit the wireless charging signal to the preset charging area on the basis of reference phase information corresponding to the preset wireless charging area.

Figure 10:
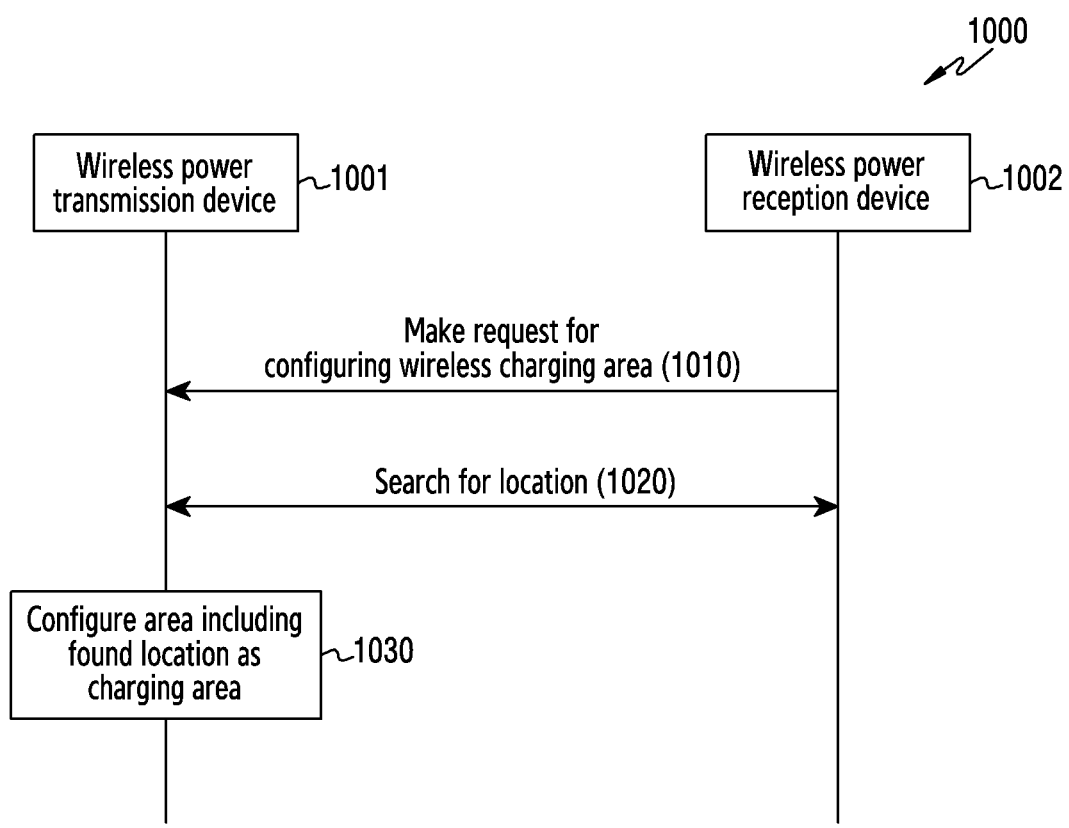
FIG. 10 is a flow diagram of a wireless charging area configuration procedure of a wireless power transmission device, according to an embodiment.
Figure 11:
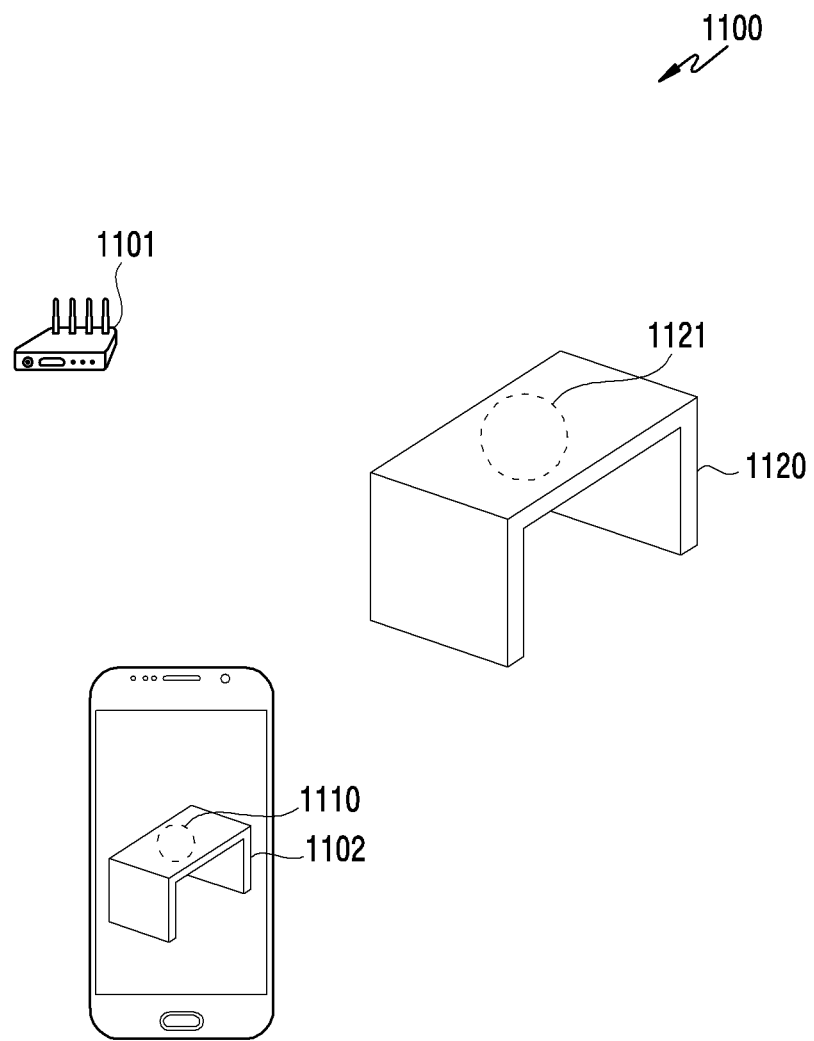
FIG. 11 is a diagram of an example in which a wireless power transmission device configures a wireless charging area, according to an embodiment.

FIG. 10 is a flow diagram of a wireless charging area configuration procedure 1000 of a wireless power transmission device 1001, according to an embodiment. FIG. 11 is a diagram of an example 1100 of configuring a wireless charging area 1121 by a wireless power transmission device 1001, according to an embodiment. FIGS. 10 and 11 are described with reference to the configuration of the electronic device 101 of FIG. 1 or the electronic device 201 of FIG. 2.

At step 1010, a wireless power reception device 1002 may transmit a charging area configuration request to a wireless power transmission device 1001. The wireless power reception device 1002 may transmit the charging area configuration request to the wireless power transmission device 1001 on the basis of a user input on a user interface displayed on a display device 160.

At step 1020, the devices 1001 and 1002 may perform a location search. The location search may include a process in which the wireless power reception device 1002 transmits location information to the wireless power transmission device 1001 and a process in which the wireless power transmission device 1001 identifies an area including the location according to the location information.

The location information may include the location of the wireless power reception device 1002, the location of an object included in a preview image acquired by a camera 180 of the wireless power reception device 1002, or a combination thereof.

The camera 180 of the wireless power reception device 1002 may be implemented as a depth camera. The wireless power reception device 1002 may identify the location in an actual space of objects included in the preview image acquired through the depth camera. The wireless power reception device 1002 may acquire a preview image including a predetermined object 1120 through the camera. The wireless power reception device 1002 may select a location 1110 in the preview image acquired through the camera on the basis of a user input. The wireless power reception device 1002 may transmit location information indicating a location 1121 on the predetermined location 1120 corresponding to the location 1110 selected on the basis of the user input to the wireless power transmission device 1001.

At step 1030, the wireless power transmission device 1001 may configure an area including the found location as the charging area. The wireless power transmission device 1001 may configure an area having a preset size including the location of the wireless power reception device 1002 as the charging area on the basis of the location information of the wireless power reception device 1002. The wireless power transmission device 1001 may configure the area having the preset size including the location 1121 as the charging area on the basis of the location information of the wireless power reception device 1002 and the location information indicating the location 1121 on the predetermined object 1120.

An electronic device may transmit/receive a wireless communication signal to/from a wireless power reception device while wirelessly supplying power to the wireless power reception device using different frequency bands by changing a frequency band for transmitting/receiving a wireless communication signal to/from the wireless power reception device, thereby preventing deterioration of sensitivity of the wireless communication signal received by the wireless power reception device.

According to an embodiment, an electronic device may include a wireless communication circuit including a first antenna and configured to perform wireless communication with an external electronic device through the first antenna, a wireless charging circuit including a second antenna and configured to transmit wireless power to the external electronic device through the second antenna, a memory configured to store instructions, and a processor operatively connected to the wireless communication circuit, the wireless charging circuit, and the memory. The instructions, when executed, may cause the processor to execute the instructions to receive a wireless charging request from the external electronic device while wireless communication with the external electronic device is performed through the wireless communication circuit, identify a second frequency on the basis of a first frequency being used by the wireless communication circuit for the wireless communication in response to the wireless charging request, and transmit wireless power to the external electronic device on the basis of the identified second frequency through the wireless charging circuit while wireless communication with the external electronic device is performed.

The instructions, when executed, may cause the processor to identify a frequency band of wireless power which the external electronic device can receive in response to the wireless charging request and identify the second frequency in a frequency band including the first frequency in response to the identified frequency band of the wireless power corresponding to the first frequency.

The instructions, when executed, may cause the processor to identify a plurality of frequency bands of wireless communication which the external electronic device can receive in response to identification of the second frequency, identify a third frequency in a frequency band different from a frequency band including the identified second frequency among the plurality of identified frequency bands of the wireless communication, and perform wireless communication with the external electronic device on the basis of the identified third frequency, through the wireless communication circuit.

The instructions, when executed, may cause the processor to identify an idle time of the wireless communication circuit and transmit wireless power to the external electronic device on the basis of the identified second frequency, in the identified idle time of the wireless communication.

The second antenna may be an array antenna, which is capable of transmitting a directional wireless signal and includes a plurality of antennas, and the instructions, when executed, may cause the processor to receive location information of the external electronic device and control a number of antennas into which signals are input among a plurality of antennas, a size of the signals input into the antennas, a phase of the signals input into the array antenna, or a combination thereof on the basis of the received location information, to receive as much wireless power as possible on the basis of the second frequency in an area in which the external electronic device is located.

The instructions, when executed, may cause the processor to receive information on a reception intensity of the wireless power from the external electronic device and control the number of antennas into which signals are input among the plurality of antennas, the size of the signals input into the antennas, the phase of the signals input into the antennas, or the combination thereof on the basis of the received location information.

The instructions, when executed, may cause the processor to receive location information of the external electronic device, identify whether the external electronic device is located in a preset area in which wireless charging is possible on the basis of the received location information, and when the external electronic device is not located in the preset area in which wireless charging is possible, make a request for changing the location to the external electronic device.

The instructions, when executed, may cause the processor to receive location information from the external electronic device and configure a wireless charging area on the basis of the location information of the external electronic device.

The instructions, when executed, may cause the processor to receive a wireless charging request from the external electronic device through the first antenna, the second antenna, or a combination thereof.

The instructions, when executed, may cause the processor to identify frequency bands of wireless power which the external electronic device can receive in response to the wireless charging request and identify a frequency distinguished from frequencies included in a frequency band including the first frequency among the identified frequencies of the wireless power as the second frequency.

According to an embodiment, a method of operating an electronic device may include receiving a wireless charging request from an external electronic device while wireless communication with the external electronic device is performed through a communication circuit of the electronic device, identifying a second frequency on the basis of a first frequency being used by the wireless communication circuit for the wireless communication in response to the wireless charging request, and transmitting wireless power to the external electronic device on the basis of the identified second frequency through a wireless charging circuit of the electronic device while wireless communication with the external electronic device is performed.

Identifying the second frequency may include identifying a frequency band of wireless power which the external electronic device can receive in response to the wireless charging request and identifying the second frequency in a frequency band including the first frequency in response to the identified frequency band of the wireless power corresponding to the first frequency.

Transmitting the wireless power to the external electronic device may include identifying a plurality of frequency bands of wireless communication which the external electronic device can receive in response to identification of the second frequency, identifying a third frequency in a frequency band different from a frequency band including the identified second frequency among the plurality of identified frequency bands of the wireless communication, and performing wireless communication with the external electronic device on the basis of the identified third frequency, through the wireless communication circuit.

Transmitting the wireless power to the external electronic device may include identifying an idle time of the wireless communication circuit and transmitting wireless power to the external electronic device on the basis of the identified second frequency, in the identified idle time of the wireless communication.

The antenna of the wireless charging circuit may be an array antenna, which is capable of transmitting a directional wireless signal and includes a plurality of antennas, and the method may further include receiving the location information of the external electronic device may include receiving location information of the external electronic device and controlling a number of antennas into which signals are input among a plurality of antennas, a size of the signals input into the antennas, a phase of the signals input into the antennas, or a combination thereof on the basis of the received location information, to receive as much wireless power as possible on the basis of the second frequency in an area in which the external electronic device is located.

The method may further include receiving information on a reception intensity of the wireless power from the external electronic device and controlling the number of antennas into which signals are input among the plurality of antennas, the size of the signals input into the antennas, the phase of the signals input into the antennas, or the combination thereof on the basis of the received location information.

The method may further include receiving location information of the external electronic device, identifying whether the external electronic device is located in a preset area in which wireless charging is possible on the basis of the received location information, and, when the external electronic device is not located in the preset area in which wireless charging is possible, making a request for changing the location to the external electronic device.

The method may further include receiving location information from the external electronic device and an operation of configuring a wireless charging area on the basis of the location information of the external electronic device.

Receiving the wireless charging request from the external electronic device may include receiving a wireless charging request from the external electronic device through the first antenna of the wireless communication circuit, the second antenna of the wireless charging circuit, or a combination thereof.

Identifying the second frequency may include identifying frequency bands of wireless power which the external electronic device can receive in response to the wireless charging request and identifying a frequency distinguished from frequencies included in a frequency band including the first frequency among the identified frequencies of the wireless power as the second frequency.

According to an embodiment, an electronic device may include a first antenna configured to perform wireless communication with an external electronic device using a non-directional wireless communication signal, an array antenna including a plurality of second antennas arranged in a preset structure and configured to transmit a directional wireless charging signal to the external electronic device through the plurality of second antennas, a memory configured to store instructions, and a processor operatively connected to the first antenna and the array antenna. The instructions, when executed, may cause the processor to receive a wireless charging request from the external electronic device while wireless communication with the external electronic device is performed using the non-directional wireless communication signal, identify whether a frequency of the wireless communication signal is included in a frequency band of the wireless charging signal in response to the wireless charging request, when the frequency of the wireless communication signal is included in the frequency band, changing the frequency of the wireless communication signal to a frequency of a frequency band different from the frequency band on the basis of a wireless communication frequency band which the external electronic device can receive, transmit the wireless charging signal of the frequency band to the external electronic device, and when the frequency of the wireless communication signal is not included in the frequency band, transmit the wireless charging signal of the frequency band to the external electronic device.

When the frequency of the wireless communication signal is included in the frequency band, the instructions, when executed, may cause the processor to identify whether the frequency band of the wireless communication signal can be changed on the basis of the wireless communication frequency band which the external electronic device can receive, when it is identified that the frequency band of the wireless communication signal can be changed, change the frequency of the wireless communication signal to a frequency of a frequency band different from the frequency band on the basis of the wireless communication frequency band which the external electronic device can receive, transmit the wireless charging signal of the frequency band to the external electronic device, when it is identified that the frequency band of the wireless communication signal cannot be changed, identify an idle time of the wireless communication, and transmit the wireless charging signal of the frequency band to the external electronic device in the identified idle time of the wireless communication.

When it is identified that the frequency band of the wireless communication signal cannot be changed, the instructions, when executed, may cause the processor to identify two channels having the largest difference between center frequencies therebetween among a plurality of available channels of the frequency band, transmit the wireless charging signal to the external electronic device through one of the identified two channels, and perform the wireless communication with the external electronic device through the other channel of the identified two channels.

The one channel may be a channel having the highest center frequency among the plurality of available channels of the frequency band, and the other channel may be a channel having the lowest center frequency among the plurality of available channels of the frequency band.

The instructions, when executed, may cause the processor to receive location information of the external electronic device and control a phase of charging signals input into the second antennas of the array antenna to make the intensity of the wireless charging signal of the frequency band maximum in an area in which the external electronic device is located on the basis of the received location information.

The instructions, when executed, may cause the processor to transmit the wireless charging signal to the external electronic device by controlling the phase of the charging signals input into the second antennas on the basis of a reference phase corresponding to the received location information, receive information on the reception intensity of the wireless charging signal from the external electronic device, when the received reception intensity is equal to or smaller than a reference reception intensity, transmit the wireless charging signal to the external electronic device by controlling the phase of the charging signals input into the second antennas on the basis of other phases corresponding to the reference phase, receive information on the reception intensity of the wireless charging signal on the basis of the other phases corresponding to the reference phase from the external electronic device, identify one of the other phases as a new reference phase on the basis of the received reception intensity, and transmit the wireless charging signal to the external electronic device by controlling the phase of the charging signals input into the second antennas on the basis of the new reference phase.

The instructions, when executed, may cause the processor to receive location information of the external electronic device, identify whether the external electronic device is located in a preset wireless charging area on the basis of the received location information, when the external electronic device is located in the preset wireless charging area, control the phase of the charging signals input into the second antennas of the array antenna to make the intensity of the wireless charging signal of the frequency band maximum in the preset wireless charging area, and when the external electronic device is not located in the preset wireless charging area, make a request for changing the location to the external electronic device.

The instructions, when executed, may cause the processor to receive location information from the external electronic device and configure an area having a preset size from the location according to the location information of the external electronic device as the wireless charging area in response to the location information.

The location information included in the wireless charging area configuration request may include the location of the external electronic device, the location of an object included in a preview image acquired through a camera of the external electronic device, or a combination thereof.

The frequency band may have a center frequency higher than that of the other frequency band.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a wireless communication circuit comprising a first antenna and configured to perform wireless communication with an external electronic device through the first antenna;
   a wireless charging circuit comprising a second antenna and configured to transmit wireless power to the external electronic device through the second antenna;
   a memory configured to store instructions; and
   a processor operatively connected to the wireless communication circuit, the wireless charging circuit, and the memory,
   wherein the instructions, when executed, cause the processor to:
      prior to transmitting wireless power to the external electronic device, receive a wireless charging request from the external electronic device in response to the external electronic device determining that wireless charging is needed while wireless communication with the external electronic device is performed through the wireless communication circuit,
      identify a second frequency based on a first frequency being used by the wireless communication circuit for the wireless communication in response to the wireless charging request, and
      transmit wireless power to the external electronic device based on the identified second frequency through the wireless charging circuit while wireless communication with the external electronic device is performed.

2. The electronic device of claim 1, wherein the instructions, when executed, further cause the processor to identify a frequency band of wireless power which the external electronic device can receive in response to the wireless charging request and identify the second frequency in a frequency band including the first frequency in response to the identified frequency band of the wireless power corresponding to the first frequency.

3. The electronic device of claim 1, wherein the instructions, when executed, further cause the processor to identify a plurality of frequency bands of wireless communication which the external electronic device can receive in response to identification of the second frequency, identify a third frequency in a frequency band different from a frequency band including the identified second frequency among the plurality of identified frequency bands of the wireless communication, and perform wireless communication with the external electronic device based on the identified third frequency through the wireless communication circuit.

4. The electronic device of claim 1, wherein the instructions, when executed, further cause the processor to identify an idle time of the wireless communication circuit and transmit wireless power to the external electronic device based on the identified second frequency in the identified idle time of the wireless communication.

5. The electronic device of claim 1, wherein the second antenna is an array antenna which is capable of transmitting a directional wireless signal and includes a plurality of antennas, and wherein the instructions, when executed, further cause the processor to receive location information of the external electronic device and control a number of antennas into which signals are input among a plurality of antennas, a size of the signals input into the antennas, a phase of the signals input into the antennas, or a combination thereof, based on the received location information to receive as much wireless power as possible based on the second frequency in an area in which the external electronic device is located.

6. The electronic device of claim 5, wherein the instructions, when executed, further cause the processor to receive information on a reception intensity of the wireless power from the external electronic device and control the number of antennas into which signals are input among the plurality of antennas, the size of the signals input into the antennas, the phase of the signals input into the antennas, or the combination thereof, based on the received location information.

7. The electronic device of claim 1, wherein the instructions, when executed, further cause the processor to receive location information of the external electronic device, identify whether the external electronic device is located in a preset area in which wireless charging is possible based on the received location information, and when the external electronic device is not located in the preset area in which wireless charging is possible, make a request for changing the location to the external electronic device.

8. The electronic device of claim 1, wherein the instructions, when executed, further cause the processor to receive location information from the external electronic device and configure a wireless charging area based on the location information of the external electronic device.

9. The electronic device of claim 1, wherein the instructions, when executed, further cause the processor to receive a wireless charging request from the external electronic device through the first antenna, the second antenna, or a combination thereof.

10. The electronic device of claim 1, wherein the instructions, when executed, further cause the processor to identify frequency bands of wireless power which the external electronic device can receive in response to the wireless charging request and identify a frequency distinguished from frequencies included in a frequency band including the first frequency among the identified frequencies of the wireless power as the second frequency.

11. A method of operating an electronic device, comprising:
   prior to transmitting wireless power to an external electronic device, receiving a wireless charging request from the external electronic device in response to the external electronic device determining that wireless charging is needed while wireless communication with the external electronic device is performed through a communication circuit of the electronic device;
   identifying a second frequency, based on a first frequency being used by the wireless communication circuit for the wireless communication, in response to the wireless charging request; and
   transmitting wireless power to the external electronic device, based on the identified second frequency through a wireless charging circuit of the electronic device while wireless communication with the external electronic device is performed.

12. The method of claim 11, wherein identifying the second frequency comprises:

identifying a frequency band of wireless power which the external electronic device can receive in response to the wireless charging request; and identifying the second frequency in a frequency band including the first frequency in response to the identified frequency band of the wireless power corresponding to the first frequency.

13. The method of claim 12, wherein transmitting the wireless power to the external electronic device comprises:

identifying a plurality of frequency bands of wireless communication which the external electronic device can receive in response to identification of the second frequency;

identifying a third frequency in a frequency band different from a frequency band including the identified second frequency among the plurality of identified frequency bands of the wireless communication; and performing wireless communication with the external electronic device, based on the identified third frequency, through the wireless communication circuit.

14. The method of claim 12, wherein transmitting the wireless power to the external electronic device comprises:

identifying an idle time of the wireless communication circuit; and transmitting wireless power to the external electronic device based on the identified second frequency in the identified idle time of the wireless communication.

15. The method of claim 11, wherein the antenna of the wireless charging circuit is an array antenna which is capable of transmitting a directional wireless signal and includes a plurality of antennas, and wherein the method further comprises:

receiving location information of the external electronic device; and controlling a number of antennas into which signals are input among the plurality of antennas, a size of the signals input into the antennas, a phase of the signals input into the antennas, or a combination thereof, based on the received location information to receive as much wireless power as possible based on the second frequency in an area in which the external electronic device is located.

16. The method of claim 15, further comprising:

receiving information on a reception intensity of the wireless power from the external electronic device; and controlling the number of antennas into which signals are input among the plurality of antennas, the size of the signals input into the antennas, the phase of the signals input into the antennas, or the combination thereof, based on the received location information.

17. The method of claim 11, further comprising:

receiving location information of the external electronic device;

identifying whether the external electronic device is located in a preset area in which wireless charging is possible, based on the received location information; and when the external electronic device is not located in the preset area in which wireless charging is possible, making a request for changing the location to the external electronic device.

18. The method of claim 11, further comprising:

receiving location information from the external electronic device; and configuring a wireless charging area based on the location information of the external electronic device.

19. The method of claim 11, wherein receiving the wireless charging request from the external electronic device comprises receiving a wireless charging request from the external electronic device through the first antenna of the wireless communication circuit, the second antenna of the wireless charging circuit, or a combination thereof.

20. The method of claim 11, wherein identifying the second frequency comprises:

identifying frequency bands of wireless power which the external electronic device can receive in response to the wireless charging request; and identifying a frequency distinguished from frequencies included in a frequency band including the first frequency among the identified frequencies of the wireless power as the second frequency.

* * * * *